US012354814B2

(12) United States Patent
Wang et al.

(10) Patent No.: US 12,354,814 B2
(45) Date of Patent: Jul. 8, 2025

(54) KEY DEVICE

(71) Applicants: Maintek Computer (Suzhou) Co., Ltd., JiangSu (CN); PEGATRON CORPORATION, Taipei (TW)

(72) Inventors: Jing-Bo Wang, JiangSu (CN); Chun-Yen Huang, JiangSu (CN); Yan-Bo An, JiangSu (CN)

(73) Assignees: Maintek Computer (Suzhou) Co., Ltd., JiangSu (CN); PEGATRON CORPORATION, Taipei (TW)

( * ) Notice: Subject to any disclaimer, the term of this patent is extended or adjusted under 35 U.S.C. 154(b) by 142 days.

(21) Appl. No.: 18/169,876

(22) Filed: Feb. 16, 2023

(65) Prior Publication Data

US 2023/0268142 A1 Aug. 24, 2023

(30) Foreign Application Priority Data

Feb. 22, 2022 (CN) ......................... 202220359844.5

(51) Int. Cl.
*H01H 13/06* (2006.01)

(52) U.S. Cl.
CPC ..... *H01H 13/063* (2013.01); *H01H 2227/016* (2013.01); *H01H 2235/006* (2013.01)

(58) Field of Classification Search
CPC .. H01H 3/00; H01H 3/12; H01H 9/00; H01H 9/02; H01H 9/0242; H01H 9/04; H01H 9/041; H01H 2003/12; H01H 2009/02; H01H 2013/00; H01H 2013/04; H01H 2013/06; H01H 2013/02; H01H 2013/50; H01H 2013/52; H01H 2223/00; H01H 2223/002; H01H 2223/044; H01H 2227/016; H01H 2235/006; H01H 13/14; H01H 13/86; H01H 13/06; H01H 13/063; H01H 13/50; H01H 13/52; H01H 13/00; H01H 2223/04; H01H 2225/028; H01H 2227/024; H01H 2235/008; H01H 2235/01; H05K 7/14; H05K 7/1427
USPC ........................................................ 200/341
See application file for complete search history.

(56) References Cited

U.S. PATENT DOCUMENTS 7,355,137 B2 * 4/2008 Kawasaki .............. H04M 1/18
200/302.1
9,941,074 B2 * 4/2018 Tu ......................... H01H 13/14

FOREIGN PATENT DOCUMENTS

CN 206639718 11/2017
CN 210349639 4/2020

* cited by examiner

*Primary Examiner* — Anthony R Jimenez
(74) *Attorney, Agent, or Firm* — J.C. PATENTS

(57) ABSTRACT

The disclosure provides a key device including a housing, a soft material layer, and a key component. The housing has at least one first assembly hole. The soft material layer is disposed on the housing and has at least one second assembly hole. The key component includes at least one key body and an elastic frame. The key body is exposed to the housing through the second assembly hole and the first assembly hole correspondingly. The elastic frame is connected with the key body and squeezes the soft material layer. The key device of the disclosure has waterproof and dustproof functions and may effectively reduce the cost.

4 Claims, 4 Drawing Sheets

KEY DEVICE

CROSS-REFERENCE TO RELATED APPLICATION

This application claims the priority benefit of China application serial no. 202220359844.5, filed on Feb. 22, 2022. The entirety of the above-mentioned patent application is hereby incorporated by reference herein and made a part of this specification.

BACKGROUND

Technical Field

The disclosure relates to a key device, and more particularly to a key device with waterproof and dustproof functions.

Description of Related Art

Nowadays, the key design of electronic devices does not have the function of being waterproof and dustproof. Internal components of electronic devices are easily broken or short-circuited due to moisture or dust, and cannot function properly. To improve the above problem, a two-color injection molding process is currently used to directly inject thermoplastic polyurethane (TPU) and other elastomers into a rigid housing to achieve the elastic movement and waterproof function of the keys. However, the cost of a two-color die is higher than that of a single-color die, which increases the cost of manufacturing the keys. In addition, the keys formed by the above method are relatively hard and inflexible, so that the user may feel uncomfortable in using them.

SUMMARY

The disclosure provides a key device which has waterproof and dustproof functions and may effectively reduce the cost.

The key device of the disclosure includes a housing, a soft material layer, and a key component. The housing has at least one first assembly hole. The soft material layer is disposed on the housing and has at least one second assembly hole. The key component includes at least one key body and an elastic frame. The key body is exposed to the housing through the second assembly hole and the first assembly hole correspondingly. The elastic frame is connected with the key body and squeezes the soft material layer.

In an embodiment of the disclosure, the above-mentioned soft material layer may include a body and at least one soft packing ring. The body may have the second assembly hole. The soft packing ring may be disposed along a periphery of the second assembly hole.

In an embodiment of the disclosure, the above-mentioned elastic frame may include at least one support portion, at least two elastic arms, and a frame portion. The support portion may be disposed corresponding to the key body. The elastic arms may be connected with two opposite sides of the support portion and squeeze the soft packing ring. The frame portion may be connected with the elastic arms and surround a periphery of the support portion.

In an embodiment of the disclosure, the diameter of the second assembly hole may be greater than or equal to the diameter of the first assembly hole.

Based on the above, in the design of the key device of the disclosure, the elastic frame of the key component squeezes the soft material layer, thereby implementing the waterproof and dustproof effect of the key device. Since the key component of the disclosure may achieve a waterproof design independent of the housing, there is no need to use a two-color injection molding process to integrally form the waterproof key as in the existing technology, thereby saving the processing cost and burden brought by the use of the two-color injection molding process. In other words, the key device of the disclosure may effectively reduce the cost compared to the waterproof keys in the existing technology.

In order to make the aforementioned features and advantages of the disclosure comprehensible, embodiments accompanied with drawings are described in detail below.

DESCRIPTION OF THE EMBODIMENTS

Figure 1:
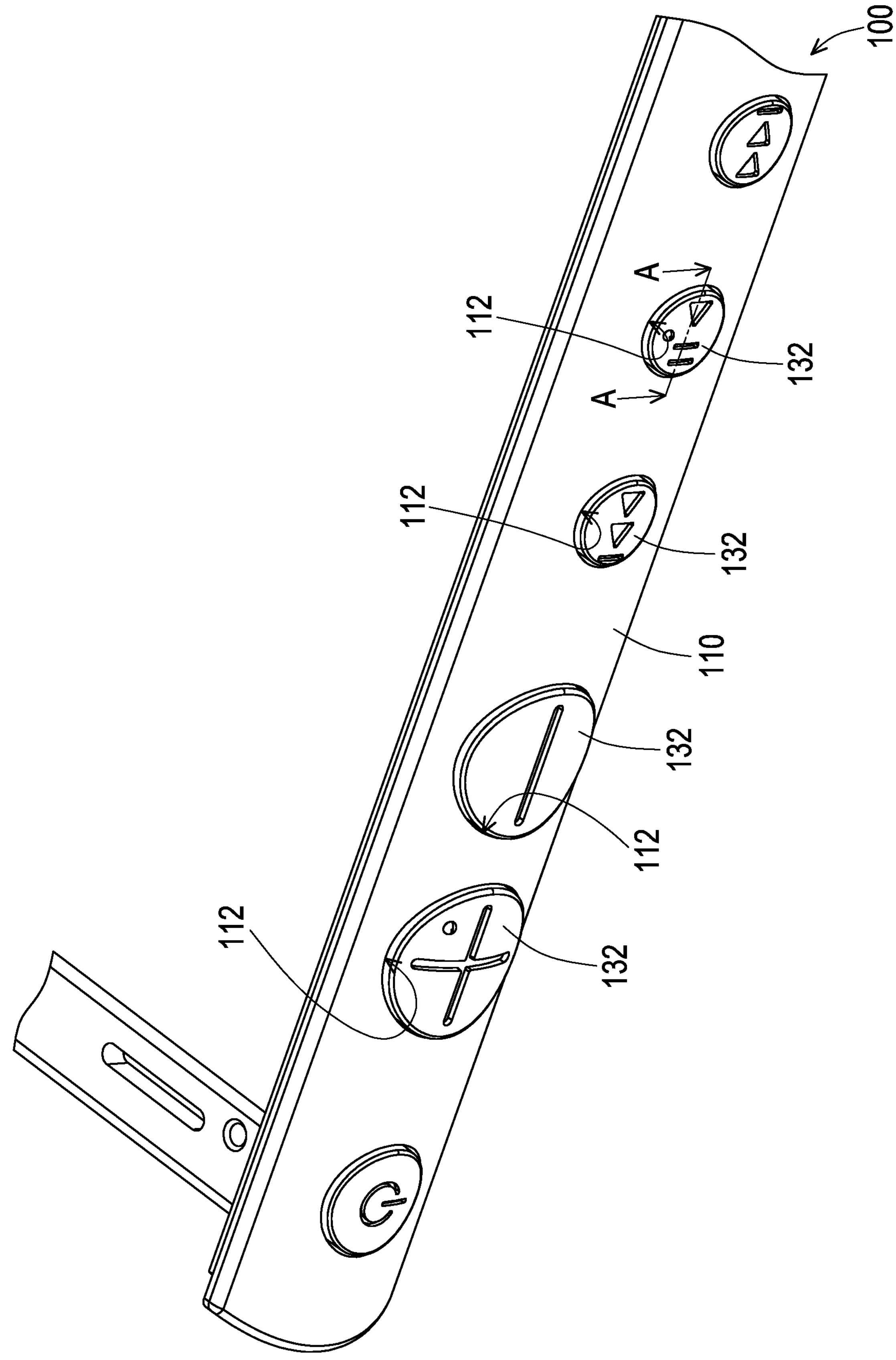
FIG. 1 is a perspective schematic view of a key device according to one embodiment of the disclosure.
Figure 2:
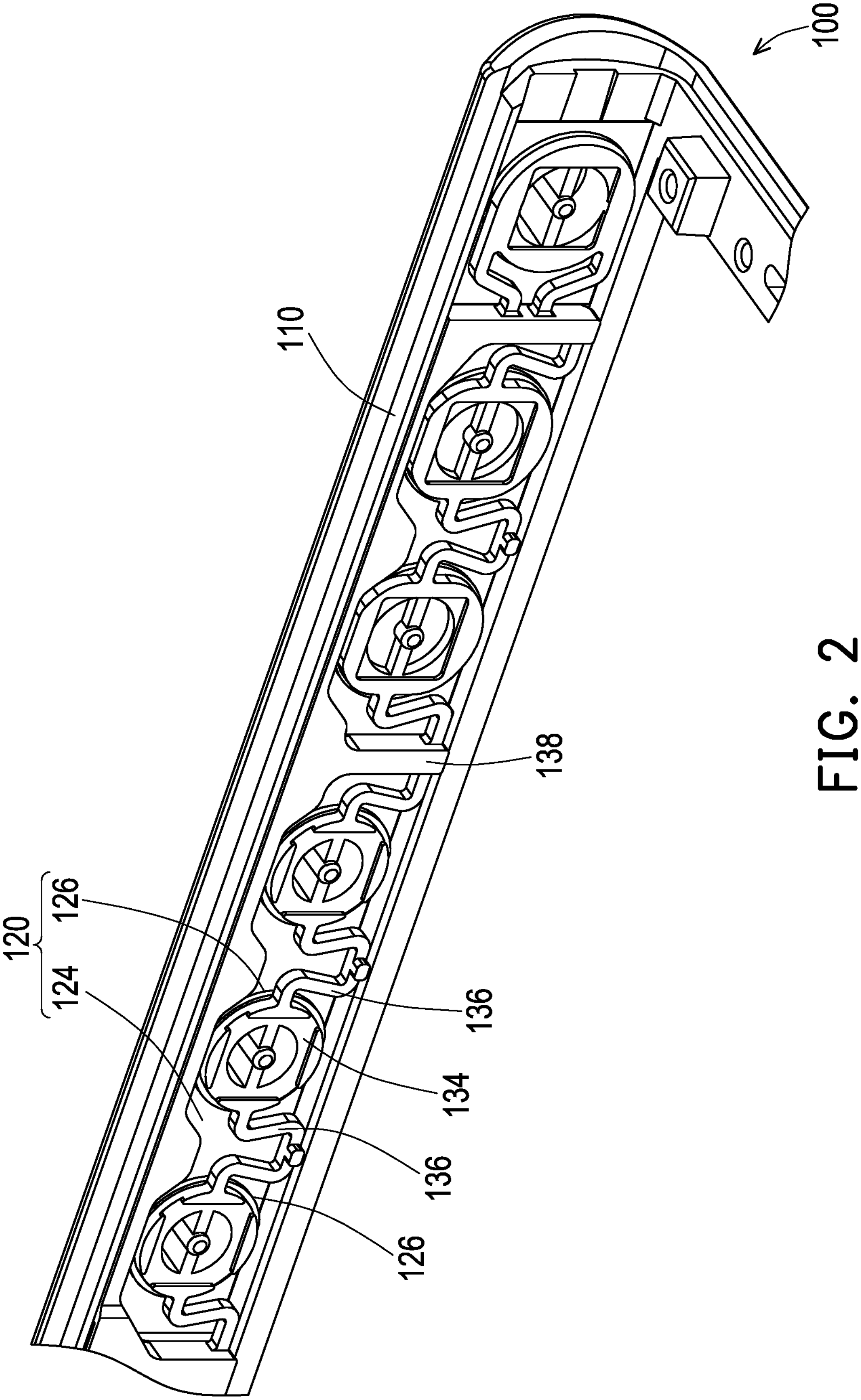
FIG. 2 is a perspective schematic view of the key device of FIG. 1 from another view angle.
Figure 3:
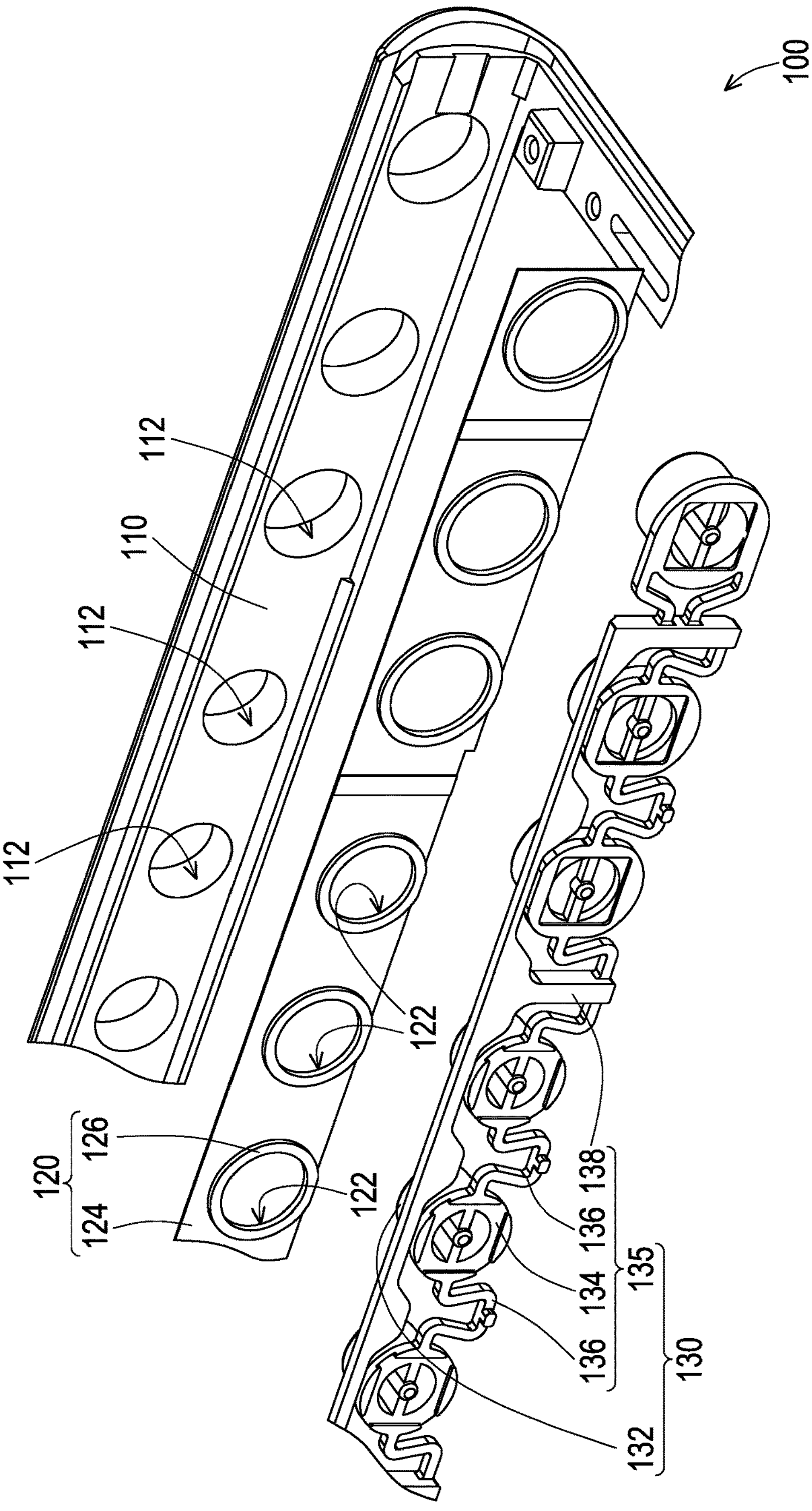
FIG. 3 is a perspective exploded schematic view of the key device of FIG. 2.
Figure 4:
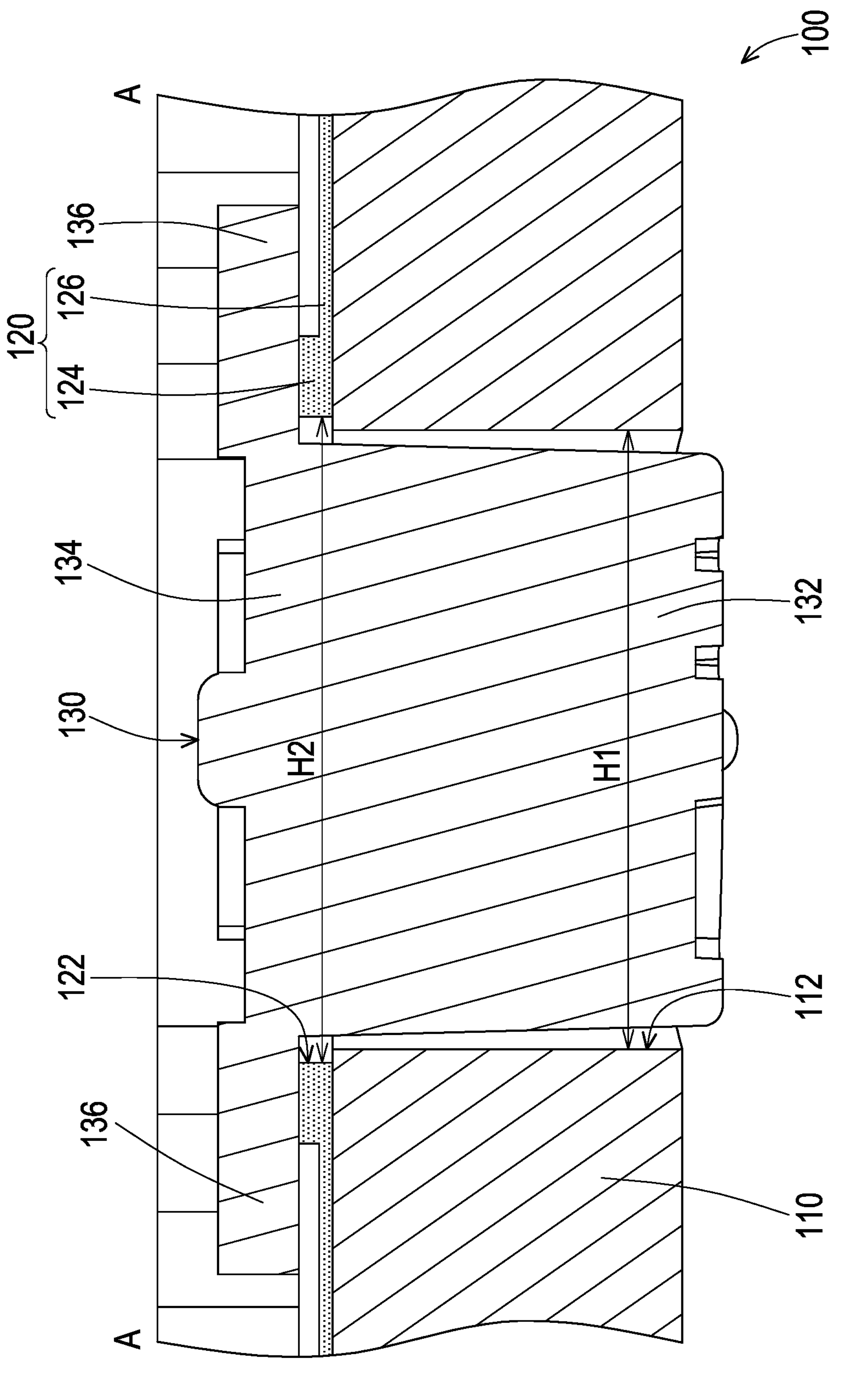
FIG. 4 is a cross-sectional schematic view along a section line A-A of FIG. 1.

FIG. 1 is a perspective schematic view of a key device according to one embodiment of the disclosure. FIG. 2 is a perspective schematic view of the key device of FIG. 1 from another view angle. FIG. 3 is a perspective exploded schematic view of the key device of FIG. 2. FIG. 4 is a cross-sectional schematic view along a section line A-A of FIG. 1.

Please refer to FIGS. 1, 2, 3, and 4. In this embodiment, the key device 100 in the embodiment of the disclosure includes a housing 110, a soft material layer 120, and a key component 130. The housing 110 has at least one first assembly hole 112 (a plurality of first assembly holes 112 are schematically shown). A soft material layer 120 is disposed on the housing 110 and has at least one second assembly hole 122 (a plurality of second assembly holes 122 are schematically shown).

In detail, please refer to FIG. 3 and FIG. 4. The second assembly hole 122 of the soft material layer 120 is disposed corresponding to the first assembly hole 112 of the housing 110. The diameter H2 of the second assembly hole 122 is slightly greater than or equal to the diameter H1 of the first assembly hole 112. The shape of the first assembly hole 112 and the shape of the second assembly hole 122 are, for example, circular, but not limited thereto. The soft material layer 120 includes a body 124 and at least one soft packing ring 126 (a plurality of soft packing rings 126 are schematically shown). The body 124 includes the second assembly hole 122 and the soft packing ring 126 is disposed along a periphery of the second assembly hole 122. That is, the shape of the soft packing ring 126 is, for example, annular, but not limited thereto. The material of the soft packing ring 126 may be, for example, foam, rubber, or other suitable materials, which is not limited herein.

In addition, the key component 130 of this embodiment includes at least one key body 132 (a plurality of key bodies 132 are schematically shown) and an elastic frame 135. The key body 132 is exposed to the housing 110 through the second assembly hole 122 and the first assembly hole 112 correspondingly. The elastic frame 135 is connected with the key body 132 and squeezes the soft packing ring 126 of the soft material layer 120. More specifically, the elastic frame 135 includes at least one support portion 134 (a plurality of support portions 134 are schematically shown), at least two elastic arms 136 (a plurality of elastic arms 136 are schematically shown), and a frame portion 138. The support portion 134 is disposed corresponding to the key body 132. That is, the number of the support portion 134 corresponds to the number of the key body 132. The elastic arms 136 is connected with two opposite sides of the support portion 134 and squeezes the soft packing ring 126. The frame portion 138 is connected with the elastic arms 136 and surrounds a periphery of the support portion 134. In other words, two opposite sides of the support portion 134 are connected with two elastic arms 136, and the elastic arms 136 are connected with the frame portion 138. Preferably, the key body 132 and the elastic frame 135 may be integrally formed.

Since the elastic frame 135 of the key component 130 of this embodiment adopts the design of the elastic arm 136, the key device 100 of the embodiment may provide a better pressing experience. The key device 100 may be, for example, an on-off switch, a volume button, or other function keys, which is not limited herein.

In assembling, the soft material layer 120 may be assembled on the housing 110 first, and then the key component 130 may be assembled. The key component 130 squeezes the soft material layer 120, thereby implementing the waterproof and dustproof effect of the key device 100. Since the key component 130 of this embodiment may achieve a waterproof design independent of the housing 110, there is no need to use a two-color injection molding process to integrally form the waterproof key as in the existing technology. The processing cost and burden brought by the use of the two-color injection molding process is then saved. In other words, the key device 100 of this embodiment may effectively reduce the cost compared to the waterproof keys in the existing technology.

To sum up, in the design of the key device in the embodiment of the disclosure, the elastic frame of the key component squeezes the soft material layer, thereby implementing the waterproof and dustproof effect of the key device. Since the key component in the embodiment of the disclosure may achieve a waterproof design independent of the housing, there is no need to use a two-color injection molding process to integrally form the waterproof key as in the existing technology. The processing cost and burden brought by the use of the two-color injection molding process is then saved. In other words, the key device in the embodiment of the disclosure may effectively reduce the cost compared to the waterproof keys in the existing technology.

Furthermore, it should be noted that the above embodiments are only used to illustrate the technical solutions of the disclosure and are not intended to limit it. Although the disclosure has been described in detail with reference to the above embodiments, persons of ordinary skill in the art should understand that they may still modify the technical solutions described in the above embodiments, or replace some or all of the technical features therein with equivalents, and that modifications or replacements of corresponding technical solutions do not substantially deviate from the scope of the technical solutions of the embodiments of the disclosure.

What is claimed is:

1. A key device, comprising:
- a housing having at least one first assembly hole;
- a soft material layer disposed on the housing and having at least one second assembly hole, wherein a material of the soft material layer comprises foam or rubber; and
- a key component including at least one key body and an elastic frame, wherein the at least one key body is exposed to the housing through the at least one second assembly hole and the at least one first assembly hole correspondingly, and the elastic frame is connected with the at least one key body and squeezes the soft material layer.

2. The key device according to claim 1, wherein the soft material layer comprises:
- a body having the at least one second assembly hole; and
- at least one soft packing ring disposed along a periphery of the at least one second assembly hole.

3. The key device according to claim 2, wherein the elastic frame comprises:
- at least one support portion disposed corresponding to the at least one key body;
- at least two elastic arms connected with two opposite sides of the at least one support portion and squeezing the at least one soft packing ring; and
- a frame portion connected with the at least two elastic arms and surrounding a periphery of the at least one support portion.

4. The key device according to claim 1, wherein a diameter of the at least one second assembly hole is greater than or equal to a diameter of the at least one first assembly hole.

* * * * *